(12) United States Patent
Nakajima

(10) Patent No.: US 6,947,617 B2
(45) Date of Patent: Sep. 20, 2005

(54) POLARIZED WAVE SCRAMBLER AND OPTICAL SIGNAL TRANSMISSION APPARATUS

(75) Inventor: Isao Nakajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 130 days.

(21) Appl. No.: 10/291,498

(22) Filed: Nov. 12, 2002

(65) Prior Publication Data

US 2003/0185482 A1 Oct. 2, 2003

(30) Foreign Application Priority Data

Mar. 12, 2002 (JP) ........................................ 2002-067513

(51) Int. Cl.[7] .......................... G02B 6/00; G02B 27/28; G02B 5/30
(52) U.S. Cl. ........................... 385/11; 359/485; 359/494
(58) Field of Search .................... 385/11, 27, 42–43, 385/95, 96; 250/227.18; 359/301, 303, 483, 485, 494, 497, 499–501, 184, 160; 356/345, 460, 365

(56) References Cited

U.S. PATENT DOCUMENTS

| 4,572,608 | A | * | 2/1986 | Mochizuki et al. ............ 385/11 |
| 4,979,235 | A | * | 12/1990 | Rumbaugh et al. .......... 398/205 |
| 5,283,625 | A | * | 2/1994 | Bunn, Jr. ..................... 356/463 |
| 5,335,064 | A | * | 8/1994 | Nishiura et al. ............. 356/460 |
| 5,471,546 | A | * | 11/1995 | Meier ........................... 385/11 |
| 5,488,683 | A | * | 1/1996 | Michal et al. ................. 385/98 |
| 5,798,853 | A | * | 8/1998 | Watanabe .................... 398/150 |
| 5,841,557 | A | * | 11/1998 | Otsuka et al. ................ 398/65 |
| 5,872,647 | A | * | 2/1999 | Taga et al. ................... 398/185 |
| 6,137,925 | A | * | 10/2000 | Stimple et al. ................ 385/11 |
| 6,201,237 | B1 | * | 3/2001 | Berkey et al. .......... 250/227.14 |
| 6,211,963 | B1 | * | 4/2001 | Kaliszek et al. ............. 356/465 |
| 2001/0048546 | A1 | * | 12/2001 | Georges et al. ............. 359/345 |
| 2001/0053263 | A1 | * | 12/2001 | Watanabe ..................... 385/24 |
| 2002/0076182 | A1 | * | 6/2002 | Terahara et al. ............. 385/122 |
| 2002/0085252 | A1 | * | 7/2002 | Chen et al. .................. 359/122 |
| 2002/0118455 | A1 | * | 8/2002 | Damask ....................... 359/484 |
| 2002/0159691 | A1 | * | 10/2002 | Zenteno ........................ 385/27 |

FOREIGN PATENT DOCUMENTS

| JP | 2001-021854 | 1/2001 | ........... G02F/1/036 |
| JP | 2002-067513 | 3/2002 | ................... 385/11 |

* cited by examiner

Primary Examiner—Frank G. Font
Assistant Examiner—Ryan Lepisto
(74) Attorney, Agent, or Firm—Staas & Halsey LLP

(57) ABSTRACT

A polarized wave scrambler and an optical signal transmission apparatus in which polarization mode dispersion is suppressed, and which has first and second polarization maintaining optical fibers, wherein respective constant components of a phase difference characteristic for optical frequencies between high-speed and low-speed axes of the first and the second polarization maintaining optical fibers are equal, and respective slopes for optical frequencies of the phase difference characteristics of the first and second polarization maintaining optical fibers are different. A plane of polarization of the linearly polarized optical signal is set to an angle between the high-speed axis and the low-speed axis of the first polarization maintaining optical fiber and the linearly polarized optical signal is supplied to the first polarization maintaining optical fiber. Further, the first and the second polarization maintaining optical fibers are spliced such that the high-speed axis of the first, corresponds to the low-speed axis of the second, polarization maintaining optical fiber, and the low-speed axis of the first, corresponds to the high-speed axis of the second, polarization maintaining optical fiber.

8 Claims, 9 Drawing Sheets

SPLICED AT ANGULAR DISPLACEMENT OF 45 DEGREES OF PLANE OF POLARIZATION

LOW-SPEED AXIS (y)
HIGH-SPEED AXIS (x)

$E_x = E_0 \cos \omega t$
$E_y = E_0 \cos \omega t$ $E_x = E_0 \cos(\omega t + \delta_x)$
$E_y = E_0 \cos(\omega t + \delta_y)$ $\Delta = \delta_x - \delta_y = \phi_0 \cos(2\pi f_1 t)$ $$\phi = \phi(f_0) + (d\phi/df)_{f=f_0} \cdot f_1$$

PRIOR ART

POLARIZED WAVE SCRAMBLER AND OPTICAL SIGNAL TRANSMISSION APPARATUS

BACKGROUND OF THE INVENTION

1. Field of the Invention

The present invention generally relates to a polarized wave scrambler and an optical signal transmission apparatus in which a wave transmission of an optical communication system does not have polarization dependent characteristics, and more particularly to a polarized wave scrambler and an optical signal transmission apparatus in which polarization mode dispersion that degrades a transmitted waveform is suppressed, and which can be easily manufactured and are low-cost and stable.

In optical communication systems, first put to practical use around 1950 in long distance optical communication systems, a regenerative repeater that has so called 3R functions, namely reshaping, retiming and regenerating, is used to relay a transmission signal.

In this system, the structure of the regenerative repeater is complex and therefore, the regenerative repeater has many adjustment points to implement the 3R functions in the regenerative repeater. Therefore, it is hard to reduce the cost of the regenerative repeater. Further, in the regenerative repeater, an optical signal, which is not usually affected by an electromagnetic wave, is converted to an electrical signal. Then, the reshaping of the electrical signal is performed and the reshaped electrical signal is re-converted to an optical signal to relay the signal. Therefore, it is required to carefully design the regenerative repeater with respect to electrical characteristics and arrangement of elements in order to avoid an increase of a code error rate due to the electromagnetic interference, and it is also hard to reduce the cost of the regenerative repeater.

In the 1980s, an optical fiber amplifier using an erbium doped optical fiber, in which ions of a rare earth element, especially the ions of erbium (Er) are doped, was developed. The optical fiber amplifier has been used in place of the regenerative repeater, and also is used as an output amplifier for terminal stations or as an amplifier provided just before a branch point to a plurality of optical fibers.

It is possible to reduce the number of parts and the number of the adjustment points in the repeater by means of employing the optical fiber amplifier using the erbium doped optical fiber as the repeater in the optical communication system. Further, because it is not required to carefully design the repeater with respect to electrical characteristics and arrangement of elements, it is possible to reduce the cost of the repeater and to raise the reliability.

The optical fiber used as a trunk transmission line and the optical fiber amplifier using the erbium doped optical fiber has polarization dependent loss (PDL) and polarization mode dispersion (PMD) which basically correspond to group delay time if the electrical signal is transmitted. The PDL and the PMD degrade an envelope waveform of the optical signal that is modulated by the electrical signal. The envelope waveform of the optical signal, which is modulated by the electrical signal, is reproduced at the receiving side. Therefore, transmission performance is degraded according to the PDL and the PMD.

Especially, a high speed optical communication system is needed because communication traffic becomes great. In the high speed optical communication system, duration interval of one optical pulse is short and the effect of the PDL and the PMD cannot be negligible. Therefore, the polarized wave scrambler is employed in the optical communication system to propagate the light in the optical fiber without maintaining a constant polarization. The polarized wave scrambler plays an important roll as mentioned above, but it is also required to be manufactured with low-cost and to be stable, and further, it is also required not to degrade the transmission characteristics.

The present invention provides a polarized wave scrambler in which the polarization mode dispersion, which degrades a transmitted waveform, is suppressed, and which can be easily manufactured, and an optical signal transmission apparatus in which the polarization mode dispersion is suppressed using such polarized wave scrambler.

2. Description of the Related Art

Conventionally, technologies to polarized-wave-scramble a light by means of controlling polarization are as follows, (1) a polarized wave scrambler in which optical polarization elements are mechanically moved to control the polarization, (2) a polarized wave scrambler in which the polarization angle of the linearly polarized optical signal is set between a high speed axis and a low speed axis of a polarization maintaining optical fiber and then, the optical signal is supplied to the polarization maintaining optical fiber, and (3) a polarized wave scrambler in which a linearly polarized optical signal is supplied to a Lithium Niobate (LiNbO$_3$) modulator, and a phase of the optical signal propagated through one waveguide is controlled using electro-optic effect, by means of which the phase of the light is controlled by voltage, or thermo-optic effect, by means of which the phase of the light is controlled by heat.

The polarized wave scrambler (1) has a complex structure and therefore it is hard to reduce cost. Further, mechanically moving parts may cause a problem of durability for the polarized wave scrambler and therefore, the reliability is low. For the polarized wave scrambler (3) using the Lithium Niobate (LiNbO$_3$) modulator, the cost of the Lithium Niobate (LiNbO$_3$) modulator is high.

Therefore, the polarized wave scramblers (1) and (3) are not suitable to manufacture a low-cost polarized wave scrambler. However, the polarized wave scrambler (2) is suitable to manufacture a low-cost polarized wave scrambler.

First, an example of the polarization maintaining optical fiber and the polarization mode dispersion will be explained.

FIG. 1 shows an example of the polarization maintaining optical fiber and a sectional diagram of the polarization maintaining optical fiber. This polarization maintaining optical fiber is called "a panda-fiber" and which panda-fiber was developed in Japan.

In FIG. 1, reference numeral 100 shows the polarization maintaining optical fiber, reference numeral 101 shows its core, reference numeral 102 shows its cladding, reference numeral 103 and 103a show stress generating parts that are formed at both side of the core 101 in the cladding 102.

The stress generating parts 103 and 103a consist of B$_2$O$_3$ doped silica glass. The coefficient of thermal expansion of the B$_2$O$_3$, doped silica glass is several times greater than that of silica glass. After optical fiber drawing is performed, as the optical fiber shrinks when the temperature of the optical fiber decreases, the stress stretches the core in the directions of a line connecting between and toward the stress generating parts 103 and 103a. Therefore, compressive stress compresses the core in the direction perpendicular to the line connecting between the stress generating parts 103 and 103*a*. As a result, a birefringent optical fiber, which has different refractive indexes for the propagating light in the core depending on the direction, can be produced.

The refractive index in the direction of the line connecting between the stress generating parts 103 and 103*a* is low and the refractive index in the direction perpendicular to the line connecting between the stress generating parts 103 and 103*a* is high. Therefore, the propagation velocity of the light in the direction of the line connecting between the stress generating parts 103 and 103*a* is high and the propagation velocity of the light in the direction perpendicular to the line connecting between the stress generating parts 103 and 103*a* is low. An axis in the direction of the line connecting between the stress generating parts 103 and 103*a* is called the high-speed axis and another axis in the direction perpendicular to the line connecting between the stress generating parts 103 and 103*a* is called the low-speed axis.

When a plane of polarization of the linearly polarized optical signal is set at an angle to either the high-speed axis or the low-speed axis of the polarization maintaining optical fiber and then the linearly polarized optical signal is supplied to the polarization maintaining optical fiber, the plane of the polarization of the linearly polarized optical signal which propagates through the polarization maintaining optical fiber is kept constant because rotation of the plane of the polarization does not occur. As a result, the polarization state is maintained. Therefore, this optical fiber is called a polarization maintaining optical fiber.

When the plane of polarization of the linearly polarized optical signal is set to an angle between the high-speed axis and the low-speed axis of the polarization maintaining optical fiber, for example 45 degrees, and then the linearly polarized optical signal is supplied to the polarization maintaining optical fiber, the linearly polarized optical signal is divided into the high-speed axis component and the low-speed axis component and each component propagates through the optical fiber. Because the propagation velocity of the light in the direction of the high-speed axis is different from the propagation velocity of the light in the direction of the low-speed axis, it is possible to produce any polarization state at the output of the polarization maintaining optical fiber according to the length of the polarization maintaining optical fiber. However, when the polarization maintaining optical fiber is simply used, the optical output waveform is degraded. This degradation of waveform is caused by the polarization mode dispersion (PMD).

FIG. 2 shows the polarization mode dispersion.

As shown in FIG. 2, when the plane of polarization of the linearly polarized optical signal is set to an angle between the high-speed axis and the low-speed axis of the polarization maintaining optical fiber, for example 45 degrees, and then the linearly polarized optical signal is supplied to the polarization maintaining optical fiber. Because the propagation velocity of the light in the direction of the high-speed axis is different from the propagation velocity of the light in the direction of the low-speed axis, the constant phase difference between the high-speed axis component and the low-speed axis component is accumulated. This accumulated phase difference is the polarization mode dispersion.

A normal optical fiber has a wavelength dispersion characteristic, so that the propagation velocity of light is different according to the wavelength of the light. Usually, full width at half level of the propagated light pulse through the optical fiber becomes broader than that of the input light pulse, and the rising-time and the falling-time of the pulse waveform are increased.

FIG. 2 shows a waveform degraded by both the polarization mode dispersion (PMD) and the wavelength dispersion. One peak of the light pulse is divided into two peaks because of the speed difference caused by the polarization mode dispersion (PMD) and the light pulse is broadened because of the wavelength dispersion, and then the light pulse having such waveform is supplied from the polarization maintaining optical fiber.

FIG. 3 shows a conventional block diagram to polarized-wave-scramble the light according to the prior art, and also shows a light source and a driving circuit, and so on.

In FIG. 3, reference numeral 1 shows the light source that supplies the linearly polarized optical signal, for example a laser diode. Reference numeral 1—1 shows a pig-tail fiber that guides the light supplied from the light source 1 outside the light source 1.

Reference numeral 2 shows a light source driving circuit that supplies a driving current to the light source 1 and the light source driving circuit 2 is usually composed of a circuit of a current-switch-type.

Reference numeral 3 shows an oscillator that supplies a sinusoidal wave having a frequency of $f_1$, which sinusoidal wave modulates the driving current supplied from the light source driving circuit 2.

Reference numeral 4 shows a polarization maintaining optical fiber that is spliced to the pig-tail fiber 1—1. At the splicing point between the polarization maintaining optical fiber 4 and the pig-tail fiber 1—1, the polarization maintaining optical fiber 4 and the pig-tail fiber 1—1 are spliced such that the plane of polarization of the linearly polarized optical signal supplied from the light source 1 is set to an angle between the high-speed axis and the low-speed axis of the polarization maintaining optical fiber 4, for example 45 degrees. The polarized-wave-scrambler is constructed by the polarization maintaining optical fiber 4.

As shown in FIG. 3, features of this construction are that first, the light source 1 is driven by the output current supplied from the light source driving circuit 2 modulated by the sinusoidal signal having a frequency of $f_1$, supplied from the oscillator 3, and second, at the splicing point between the polarization maintaining optical fiber 4 and the pig-tail fiber 1—1, the polarization maintaining optical fiber 4 and the pig-tail fiber 1—1 are spliced such that the plane of polarization of the linearly polarized optical signal supplied from the light source 1 is set to an angle between the high-speed axis and the low-speed axis of the polarization maintaining optical fiber 4, for example 45 degrees.

FIG. 4A through FIG. 4D show the principle of the polarized wave scramble shown in FIG. 3, and FIG. 5 shows phase difference between the high-speed axis component and the low-speed axis component of the light propagating in the optical fiber generated by the polarization maintaining optical fiber as shown in FIG. 3.

FIG. 4A shows the high-speed axis and the low-speed axis of the polarization maintaining optical fiber. The x-axis denotes the high-speed axis and the y-axis denotes the low-speed axis.

FIG. 4B shows an electrical field Ex in the x-axis direction and an electrical field Ey in the y-axis direction of the input light at the input point of the polarization maintaining optical fiber 4. As described above, the plane of polarization of the input light is set to the angle between the high-speed axis and the low-speed axis of the polarization maintaining optical fiber 4, the electrical field Ex in the high-speed axis direction and the electrical field Ey in the low-speed axis direction of input light are applied at the input point of the polarization maintaining optical fiber. Especially, the electrical filed Ey in the low-speed (y-axis) direction is equal to the electrical filed Ex in the high-speed (x-axis) direction if the plane of polarization of the input light is set to the angle which is equal to 45 degrees for both the high-speed axis and the low-speed axis.

FIG. 4C shows the electrical field Ex in the x-axis direction and the electrical field Ey in the y-axis direction of the output light at the output point of the polarization maintaining optical fiber 4. As described above, a phase shift value for the high-speed axis is different from that of the low-speed axis. The phase shift value for the high-speed axis is δx and of the phase shift value of the low-speed axis is δy. As a result, the electrical field Ex in the x-axis direction and the electrical field Ey in the y-axis direction of the output light at the output point of the polarization maintaining optical fiber 4 are shown in FIG. 4C.

FIG. 4D shows a phase difference between the phase shift value of the high-speed axis direction and the phase shift value of the low speed axis direction. As described above, the phase difference is a trigonometric function of the frequency $f_1$, because the output light from the light source is modulated by the sinusoidal signal having the frequency of $f_1$.

FIG. 5A shows a graph of the phase difference generated by the polarization maintaining optical fiber 4. FIG. 5B shows the phase difference value which is approximated to a phase difference component $\phi(f_0)$ at the frequency $f_0$ and a value which is a differential coefficient of the phase φ at the frequency $f_0$ multiplied by the modulation frequency $f_1$. In this specification, the phase difference component $\phi(f_0)$ at the frequency $f_0$ is called "a constant component" and the value which is a differential coefficient of the phase φ at the frequency $f_0$, multiplied by the modulation frequency $f_1$ is called "a modulated component" or "a frequency characteristic of the phase difference". The polarized-wave-scramble can be performed by the modulated component in the polarization maintaining optical fiber.

The constant component of the phase difference generated in the polarization maintaining optical fiber corresponds to the constant difference between the propagation velocity of the light in the high-speed axis direction and the propagation velocity of the light in the low-speed axis direction, and therefore, also corresponds to the polarization mode dispersion (PMD). There is a problem in which it is possible to polarized-wave-scramble the input light by the polarization maintaining optical fiber, but it is not possible to prevent the degradation of the waveforms caused by the polarization mode dispersion (PMD).

SUMMARY OF THE INVENTION

It is a general object of the present invention to provide a polarized wave scrambler and an optical signal transmission apparatus in which the above disadvantages are eliminated. A more specific object of the present invention is to provide a polarized wave scrambler and an optical signal transmission apparatus in which polarization mode dispersion, which causes degradation of a transmitted waveform, is suppressed, and which can be easily manufactured and are low-cost and stable.

The first feature of the present invention provides a polarized wave scrambler that has a first polarization maintaining optical fiber and a second polarization maintaining optical fiber. A constant component of a phase difference characteristic for optical frequency between a high-speed axis and a low-speed axis of the first polarization maintaining optical fiber is equal to a constant component of a phase difference characteristic for optical frequency between a high-speed axis and a low-speed axis of the second polarization maintaining optical fiber, and a slope for optical frequency of the phase difference characteristic of the first polarization maintaining optical fiber is different from a slope for optical frequency of the phase difference characteristic of the second polarization maintaining optical fiber. A plane of polarization of the linearly polarized optical signal is set to an angle between the high-speed axis and the low-speed axis of the first polarization maintaining optical fiber and the linearly polarized optical signal is supplied to the first polarization maintaining optical fiber. The first polarization maintaining optical fiber and the second polarization maintaining optical fiber are spliced such that the high-speed axis of the first polarization maintaining optical fiber corresponds to the low-speed axis of the second polarization maintaining optical fiber, and the low-speed axis of the first polarization maintaining optical fiber corresponds to the high-speed axis of the second polarization maintaining optical fiber.

According to the first feature of the present invention, it is possible to polarized-wave-scramble the input light supplied to the first polarization maintaining optical fiber by means of rotating the plane of polarization of the input light that propagates through the first polarization maintaining optical fiber and the second polarization maintaining optical fiber. Further, it is also possible to suppress the polarization mode dispersion generated in the polarized wave scrambler because a sign of polarization mode dispersion generated in the first polarization maintaining optical fiber is opposite to a sign of polarization mode dispersion generated in the second polarization maintaining optical fiber.

The second feature of the present invention provides an optical signal transmission apparatus that has a light source which supplies a linearly polarized light; a frequency modulation part that frequency-modulates a frequency of the linearly polarized light with a signal having a lower frequency than the frequency of the linearly polarized light; an intensity modulation part that intensity-modulates the linearly polarized light frequency-modulated by the frequency modulation part with a signal to be transmitted; and the polarized wave scrambler having the first polarization maintaining optical fiber and the second polarization maintaining optical fiber. A plane of polarization of the intensity-modulated linearly polarized light by the intensity modulation part is set to an angle between the high-speed axis and the low-speed axis of the first polarization maintaining optical fiber and the intensity-modulated linearly polarized light is supplied to the first polarization maintaining optical fiber.

According to the second feature of the present invention, it is possible to suppress a polarization dependant characteristic even if the transmission channel has the polarization dependent characteristic because the light can be set to an arbitrary plane of polarization at a transmission side.

The third feature of the present invention provides an optical signal transmission apparatus that has a light source which supplies a linearly polarized light; a frequency modulation part that frequency-modulates a frequency of the linearly polarized light with an RZ ("Return to Zero") signal to be transmitted; an intensity modulation part that Intensity-modulates the frequency-modulated linearly polarized light by the frequency modulation part with the RZ signal; and the polarized wave scrambler having the first polarization maintaining optical fiber and the second polarization maintaining optical fiber. A plane of polarization of the intensity-modulated linearly polarized light by the intensity modulation part is set to an angle between the high-speed axis and the low-speed axis of the first polarization maintaining optical fiber and the intensity-modulated linearly polarized light is supplied to the first polarization maintaining optical fiber.

According to the third feature of the present invention, it is possible to suppress a polarization dependent characteristic even if the transmission channel has the polarization dependant characteristic because the light can be set to an arbitrary plane of polarization at a transmission side.

The fourth feature of the present invention provides the polarized wave scrambler. In the polarized wave scrambler, the slope of the phase difference characteristic for optical frequency of the first polarization maintaining optical fiber and the slope of the phase difference characteristic for optical frequency of the second polarization maintaining optical fiber are changed by controlling the lengths of the first polarization maintaining optical fiber and the second polarization maintaining optical fiber while keeping a ratio between the length of the first polarization maintaining optical fiber and the length of said second polarization maintaining optical fiber constant while the constant component of the phase difference characteristic for optical frequency between the high-speed axis and the low-speed axis of the first polarization maintaining optical fiber is kept being equal to the constant component of the phase difference characteristic for optical frequency between the high-speed axis and the low-speed axis of the second polarization maintaining optical fiber.

According to the fourth feature of the present invention, the slope for the optical frequency of the phase difference characteristics can be set to an arbitrary value.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENT

A first embodiment according to the present invention will be explained.

Figure 1:
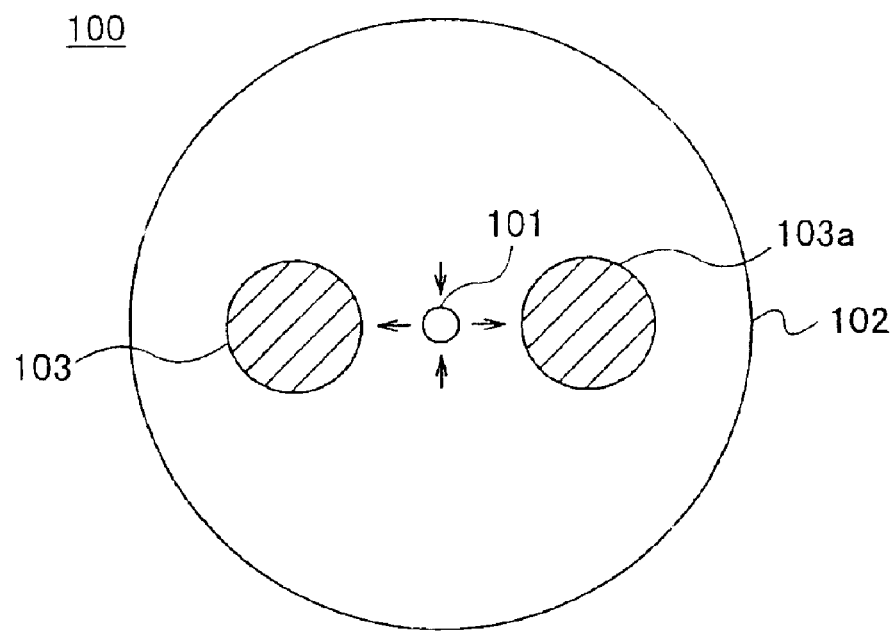
FIG. 1 shows an example of a polarization maintaining optical fiber.
Figure 2:
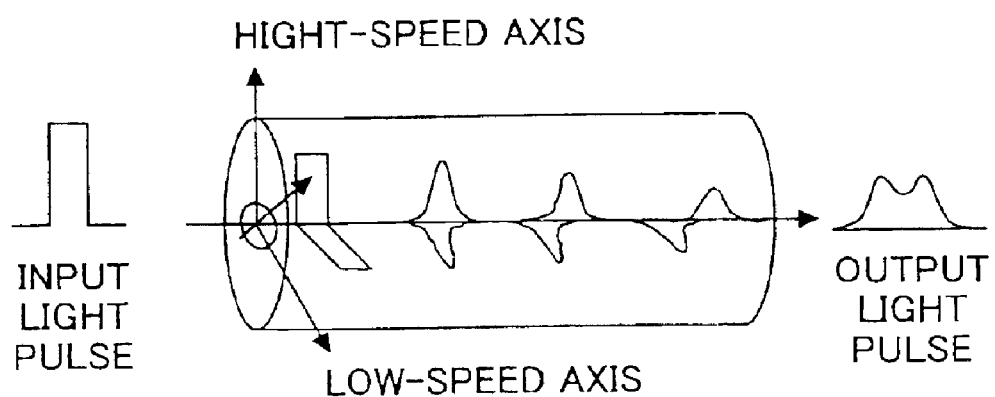
FIG. 2 shows polarization mode dispersion.
Figure 3:
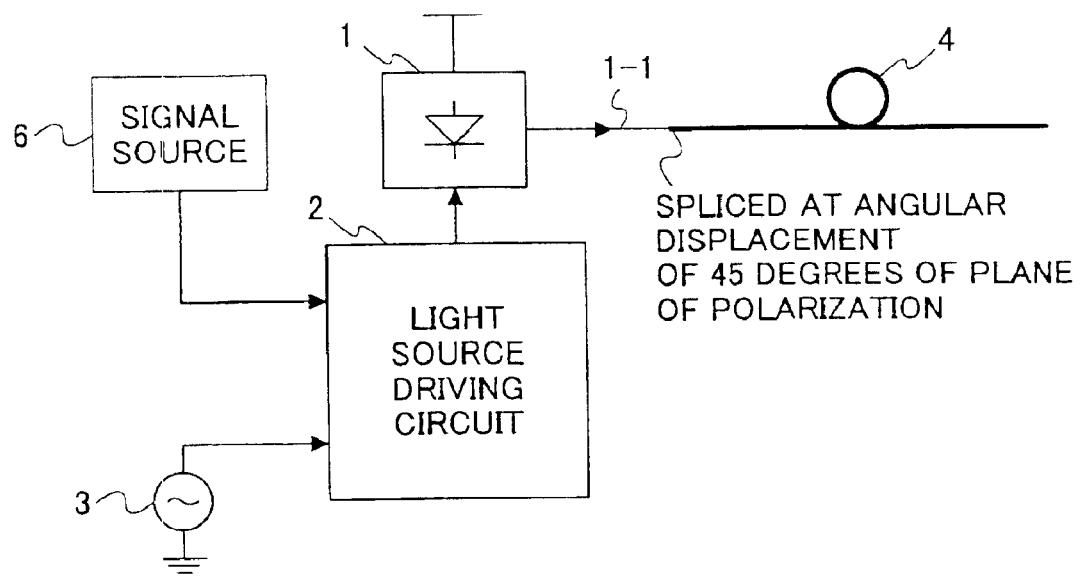
FIG. 3 shows a conventional block diagram to polarized-wave-scramble the light according to the prior art.
Figures 4A, 4B, 4C, 4D:
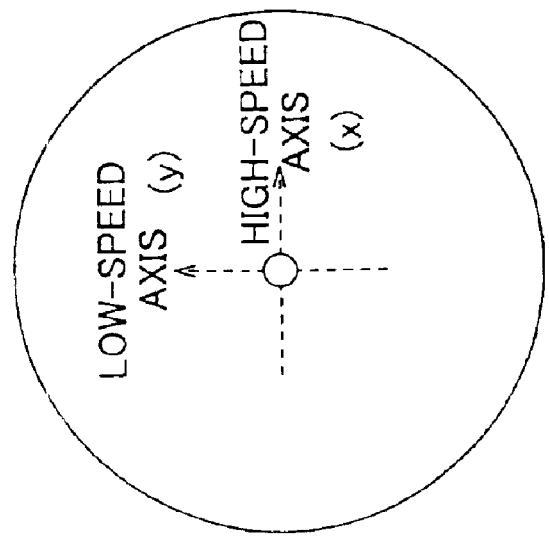
FIG. 4A shows a high-speed axis and a low-speed axis of the polarization maintaining optical fiber.
FIG. 4B shows an electrical field Ex in the x-axis direction and an electrical field Ey in the y-axis direction of the input light at the input point of the polarization maintaining optical fiber.
FIG. 4C shows the electrical field Ex in the x-axis direction and the electrical field Ey in the y-axis direction of the output light at the output point of the polarization maintaining optical fiber.
FIG. 4D shows a phase difference between the phase shift value of the high-speed axis direction and the phase shift value of the low speed axis direction.
Figures 5A, 5B:
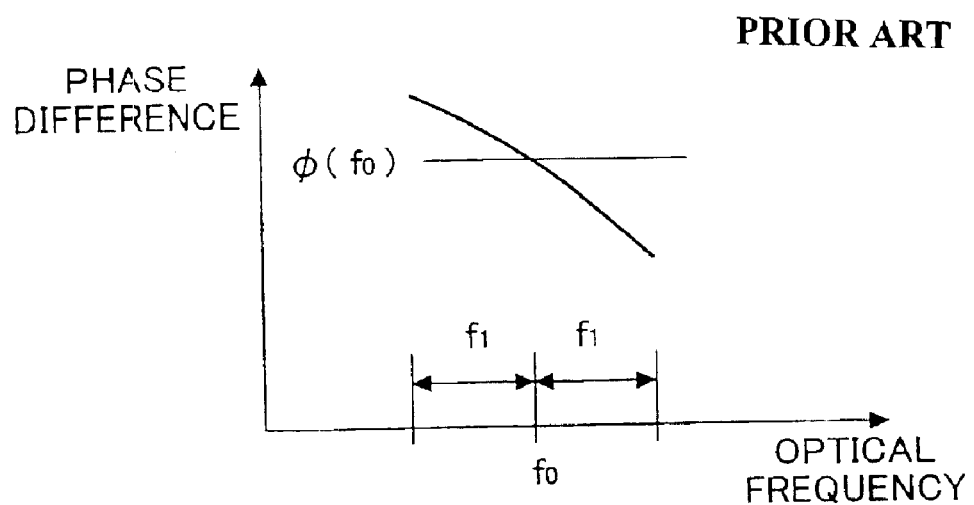
FIG. 5A shows a graph of the phase difference generated by the polarization maintaining optical fiber.
FIG. 5B shows the phase difference value.
Figure 6:
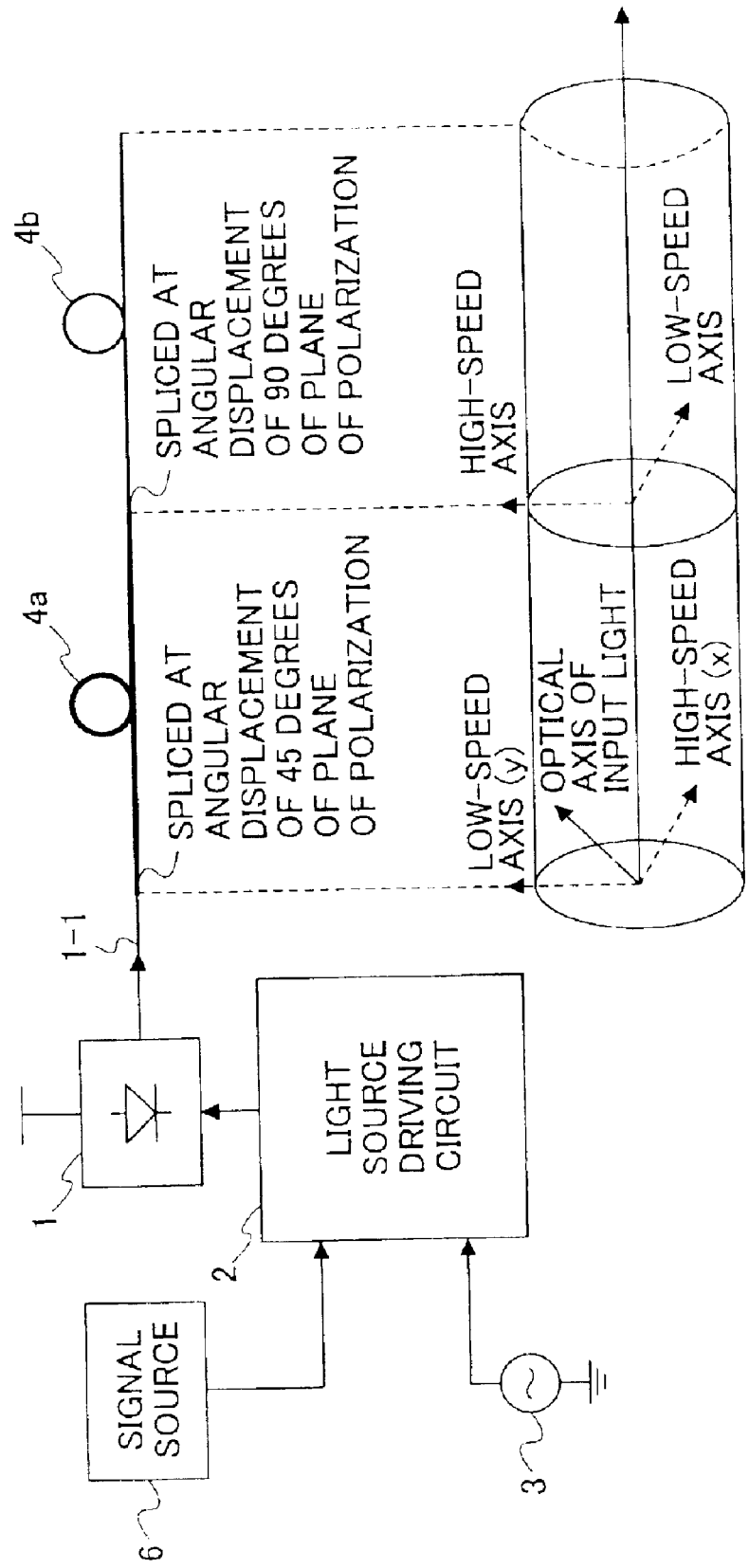
FIG. 6 shows a block diagram of an optical signal transmission apparatus using a polarized wave according to the first embodiment of the present invention.

FIG. 6 shows a block diagram of an optical signal transmission apparatus using a polarized wave scrambler according to the first embodiment of the present invention.

In FIG. 6, reference numeral 1 shows the light source that supplies the linearly polarized optical signal, for example a laser diode. It is well known that the laser diode supplies the linearly polarized light. Reference numeral 1—1 shows a pig-tail fiber that guides the light supplied from the light source 1 outside the light source 1.

Reference numeral 2 shows a light source driving circuit that supplies a driving current to the light source 1 and the light source driving circuit 2 is usually composed of a circuit of a current-switch-type.

Reference numeral 3 shows an oscillator that supplies a signal having a lower frequency than a frequency of light, which signal modulates the driving current supplied from the light source driving circuit 2. Typically, the signal may be a sinusoidal signal, a triangular signal, and so on.

Reference numeral 4a shows the first polarization maintaining optical fiber, which is spliced to the pig-tail fiber 1—1. At the splicing point between the first polarization maintaining optical fiber 4a and the pig-tail fiber 1—1, the first polarization maintaining optical fiber 4a and the pig-tail fiber 1—1 are spliced such that the plane of polarization of the linearly polarized optical signal supplied from the light source 1 is set to an angle between the high-speed axis and the low-speed axis of the first polarization maintaining optical fiber 4a, for example 45 degrees.

Reference numeral 4b shows the second polarization maintaining optical fiber, which is spliced to the first polarization maintaining optical fiber 4a. At the splicing point between the second polarization maintaining optical fiber 4b and the first polarization maintaining optical fiber 4a, the first polarization maintaining optical fiber 4a and the second polarization maintaining optical fiber 4b are spliced such that the high-speed axis of the first polarization maintaining optical fiber 4a corresponds to the low-speed axis of the second polarization maintaining optical fiber 4b, and the low-speed axis of the first polarization maintaining optical fiber 4a corresponds to the high-speed axis of the second polarization maintaining optical fiber 4b. As a result, the first polarization maintaining optical fiber 4a and the second polarization maintaining optical fiber 4b are spliced to each other at the angular displacement of 90 degrees.

The condition of splicing is shown in FIG. 6. In FIG. 6, the splicing points, the optical axis of the input signal, the high-speed axis and the low-speed axis are shown.

Reference numeral 6 shows a signal source that generates a signal to be transmitted through the optical fiber. The current supplied from the light source driving circuit 2 is switched-on or switched-off according to the output signal supplied from the signal source 6. Then, an intensity-modulated light, which is modulated by the output signal supplied from the signal source 6, is supplied from the light source 1.

As shown in FIG. 6, features of this construction are as follows. First, the output current supplied from the light source driving circuit 2 is frequency-modulated by the signal having a low frequency supplied from the oscillator 3, and then, the light frequency-modulated by the signal having a low frequency is intensity-modulated by the output signal supplied from the signal source 6. Second, at the splicing point between the first polarization maintaining optical fiber 4a and the pig-tail fiber 1—1, the first polarization maintaining optical fiber 4a and the pig-tail fiber 1—1 are spliced such that the plane of polarization of the linearly polarized optical signal supplied from the light source 1 is set to an angle between the high-speed axis and the low-speed axis of the first polarization maintaining optical fiber 4a, for example 45 degrees, and the first polarization maintaining optical fiber 4a and the second polarization maintaining optical fiber 4b are spliced to each other at the angular displacement of 90 degrees.

The polarization mode dispersion (PMD) of the first polarization maintaining optical fiber 4a and the PMD of the second polarization maintaining optical fiber 4b are equal, and the modulated component of the first polarization maintaining optical fiber 4a is different from that of the second polarization maintaining optical fiber 4b. Therefore, two kinds of polarization maintaining optical fibers having the different frequency characteristics of the phase difference, are selected.

The optical frequency of the light source 1 is modulated by the signal having the low frequency because the oscillation frequency of the light source 1 varies according to the variation of the level of the current supplied to the light source 1 according to the level of the signal having the low frequency.

Figure 7B:
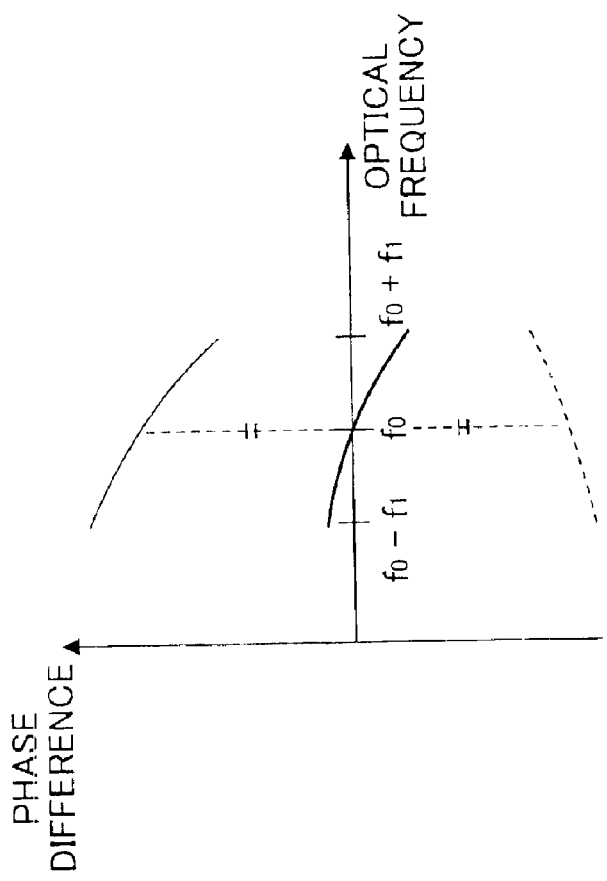
FIG. 7B shows the first effect of a composite optical fiber shown in FIG. 6.
Figure 7A:
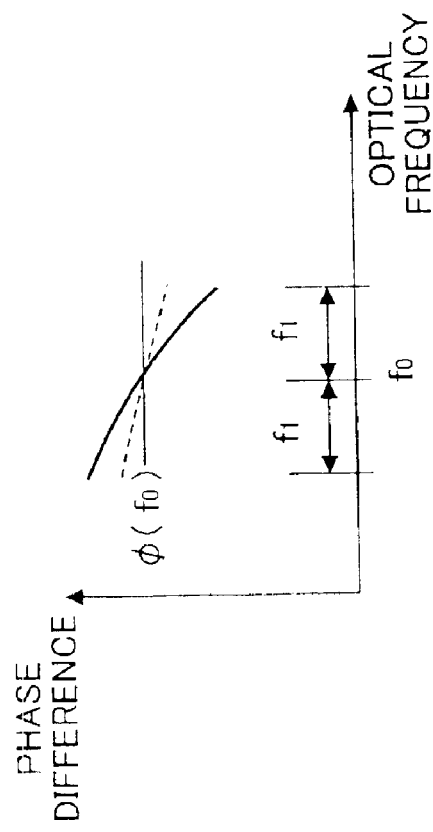
FIG. 7A shows the first effect of a composite optical fiber shown in FIG. 6.

FIG. 7A and FIG. 7B show the first effect of a composite optical fiber in which the frequency characteristics of the phase difference for the optical frequency of both polarization maintaining optical fibers have negative slopes. It is common that the frequency characteristic of the phase difference has a negative slope for the optical frequency. It is possible to change the frequency characteristic of the phase difference, for example, by changing material dispersion of the silica glass used for the core and the cladding.

FIG. 7A shows each of phase differences caused by each of polarization maintaining optical fibers. The polarization maintaining optical fibers 4a and 4b are selected such that the polarization mode dispersions $\phi(f_0)$ of both polarization maintaining optical fibers 4a and 4b are equal, and the frequency characteristics of the phase difference of the polarization maintaining optical fibers 4a and 4b are different from each other. Then, the frequency characteristics of the phase difference denoted with a bold line shows the frequency characteristic of the phase difference of the first polarization maintaining optical fibers 4a. The frequency characteristic of the phase difference denoted with a dotted line shows the frequency characteristic of the phase difference of the second polarization maintaining optical fibers 4b.

The optical signal having a center frequency of $f_0$ is modulated to a frequency range of $f_0 \pm f_1$ by the signal having the low frequency.

FIG. 7B shows the total phase difference of the composite optical fiber.

As described above, the first polarization maintaining optical fiber 4a and the second polarization maintaining optical fiber 4b are spliced to each other at the angular displacement of 90 degrees. Therefore, the high-speed axis and the low-speed axis of the second polarization maintaining optical fiber 4b correspond to the low-speed axis and the high-speed axis of the first polarization maintaining optical fiber 4a, respectively. As a result, the sign of the phase difference of the propagating light in the second polarization maintaining optical fiber 4b is reverse to the sign of the phase difference of the propagating light shown in doted line of FIG. 7A.

Therefore, as shown in FIG. 7B, the total phase difference of the composite optical fiber is a difference value between the phase difference of the first polarization maintaining optical fiber 4a and the phase difference of the second polarization maintaining optical fiber 4b, which is obtained by subtracting the phase difference of the second polarization maintaining optical fiber 4b from the phase difference of the first polarization maintaining optical fiber 4a.

The first polarization maintaining optical fiber 4a and the second polarization maintaining optical fiber 4b are selected such that the polarization mode dispersions of both the first and the second polarization maintaining optical fibers 4a and 4b are equal, and the frequency characteristics of the phase difference of the first and the second polarization maintaining optical fibers 4a and 4b are different from each other. Therefore, the polarization mode dispersions cancel each other, and the total phase difference of the composite optical fiber is the difference value between the phase difference of the first polarization maintaining optical fiber 4a and the phase difference of the second polarization maintaining optical fiber 4b, which is obtained by subtracting the phase difference of the second polarization maintaining optical fiber 4b from the phase difference of the first polarization maintaining optical fiber 4a.

As a result, it is possible to provide a polarized wave scrambler in which a waveform transfer characteristic is not degraded because the polarization mode dispersion (the constant component) that causes the degradation of the waveform is canceled and the modulated component which contributes the polarized wave scramble remains, by selecting the first polarization maintaining optical fiber 4a and the second polarization maintaining optical fiber 4b such that the polarization mode dispersions of both the first and the second polarization maintaining optical fibers 4a and 4b are equal, and the frequency characteristics of the phase difference of the first and the second polarization maintaining optical fibers 4a and 4b are different from each other.

Further, this polarized wave scrambler does not have optical elements having polarization characteristics that are mechanically moved to control the polarization, and is manufactured using only the polarization maintaining optical fibers without using expensive parts. Therefore, a low cost polarized wave scrambler can be easily manufactured.

It is assumed that the first polarization maintaining optical fiber and the second polarization maintaining optical fiber have the equal polarization mode dispersion and different frequency characteristics of the phase difference and the first polarization maintaining optical fiber has a first length and the second polarization maintaining optical fiber has a second length. It is also possible to vary the first length of the first polarization maintaining optical fiber and the second length of the second polarization maintaining optical fiber to a third length of the first polarization maintaining optical fiber and a fourth length of the second polarization maintaining optical fiber, respectively, as long as the ratio between the length of the first polarization maintaining optical fiber and the length the second polarization maintaining optical fiber is kept constant.

That is to say, the first polarization maintaining optical fiber and the second polarization maintaining optical fiber have equal polarization mode dispersion and different slopes of the frequency characteristics of the phase difference and the first polarization maintaining optical fiber has the first length and the second polarization maintaining optical fiber has the second length, and the first length and the second length are changed to the third length and the fourth length, respectively, while keeping the ratio between the third length and the fourth length to be equal to a constant ratio between the first length and the second length. Therefore, although the constant components of the phase difference between the high-speed axis and the low-speed axis for the first polarization maintaining optical fiber having the third length and the second polarization maintaining optical fiber having the fourth length are different constant components from those of the case where the first polarization maintaining optical fiber has the first length and the second polarization maintaining optical fiber has the second length, the constant component of the phase difference between the high-speed axis and the low-speed axis for the first polarization maintaining optical fiber having the third length is equal to the constant component of the phase difference between the high-speed axis and the low-speed axis for the second polarization maintaining optical fiber having the fourth length. Further, the slope of the frequency characteristics of the phase difference, which is different from that for the first length and the second length, can be set to any value by adjusting the third length and the fourth length. As a result, various kinds of polarized wave scrambler having various kinds of polarized wave scramble characteristics can be obtained by combining the first polarization maintaining optical fiber and the second polarization maintaining optical fiber.

There is the same case, as follows.

Figure 8A:
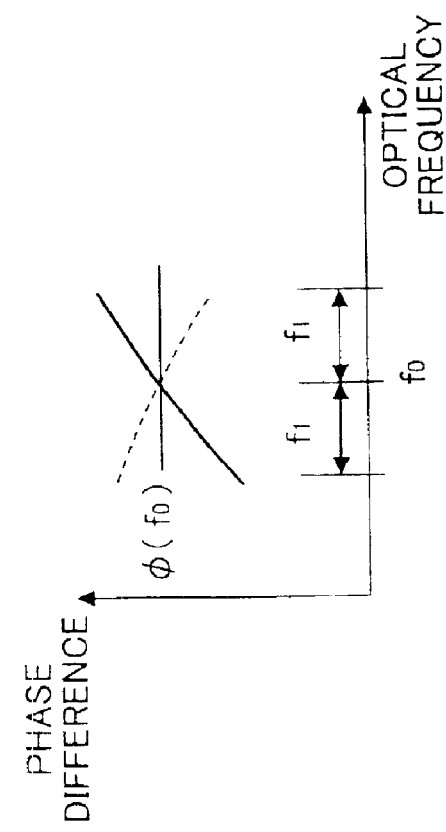
FIG. 8A shows the second of a composite optical fiber shown in FIG. 6.
Figure 8B:
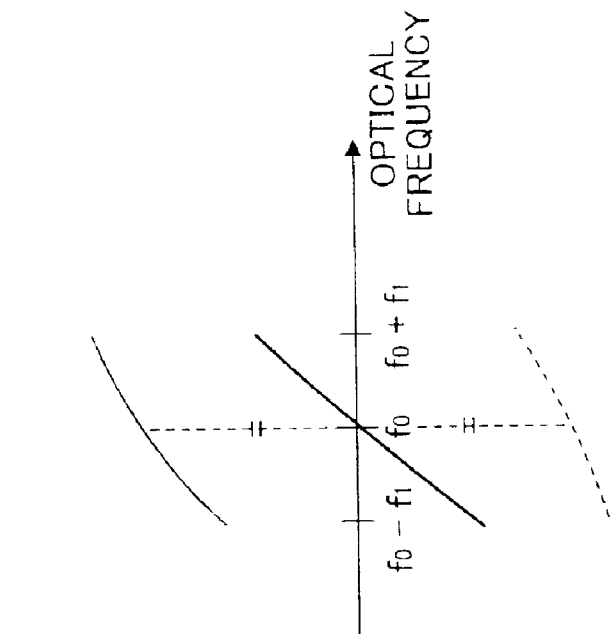
FIG. 8B shows the second effect of a composite fiber shown in FIG. 6.

FIG. 8A and FIG. 8B show the second effect of the composite optical fiber in which the frequency characteristic of the phase difference for the optical frequency of one polarization maintaining optical fiber has a negative slope and the frequency characteristic of the phase difference for the optical frequency of another polarization maintaining optical fiber has a positive slope.

As described above, it is common that the frequency characteristic of the phase difference has the negative slope for the optical frequency. However, it is possible to change the frequency characteristic of the phase difference to have the positive slope, for example, by changing material dispersion of the silica glass used for the core and the cladding and by adjusting structure dispersion of the polarization maintaining optical fiber.

FIG. 8A shows each of phase differences caused by each of polarization maintaining optical fibers. The first polarization maintaining optical fiber 4a and the second polarization maintaining optical fiber 4b are selected such that the polarization mode dispersions of both polarization maintaining optical fibers 4a and 4b are equal, and the slopes of the frequency characteristics of the phase difference of the polarization maintaining optical fibers 4a and 4b are different from each other. Then, the frequency characteristic of the phase difference denoted with a bold line shows the frequency characteristic of the phase difference of the first polarization maintaining optical fibers 4a as shown in FIG. 6. The frequency characteristic of the phase difference denoted with a dotted line shows the frequency characteristic of the phase difference of the second polarization maintaining optical fibers 4b.

FIG. 8B shows the total phase difference of the composite optical fiber. As described above, the first polarization maintaining optical fiber 4a and the second polarization maintaining optical fiber 4b are spliced to each other at the angular displacement of 90 degrees. Therefore, the high-speed axis and the low-speed axis of the second polarization maintaining optical fiber 4b correspond to the low-speed axis and the high-speed axis of the first polarization maintaining optical fiber 4a, respectively. As a result, the sign of the phase difference of the propagating light in the second polarization maintaining optical fiber 4b is reverse to the sign of the phase difference of the propagating light shown in doted line of FIG. 8A.

Therefore, as shown in FIG. 8B, the total phase difference of the composite optical fibers is a difference value between the phase difference of the first polarization maintaining optical fiber 4a and the phase difference of the second polarization maintaining optical fiber 4b, which is obtained by subtracting the phase difference of the second polarization maintaining optical fiber 4b from the phase difference of the first polarization maintaining optical fiber 4a.

The first polarization maintaining optical fibers 4a and the second polarization maintaining optical fiber 4b are selected such that the polarization mode dispersions of both the first and the second polarization maintaining optical fibers 4a and 4b are equal, and the slope of the frequency characteristics of the phase difference of the first and the second polarization maintaining optical fibers 4a and 4b are different from each other. Therefore, the polarization mode dispersions cancel each other, and the total phase difference of the composite optical fiber is the difference value between the phase difference of the first polarization maintaining optical fiber 4a and the phase difference of the second polarization maintaining optical fiber 4b, which is obtained by subtracting the phase difference of the second polarization maintaining optical fiber 4b from the phase difference of the first polarization maintaining optical fiber 4a.

As a result, it is possible to provide a polarized wave scrambler in which a waveform transfer characteristic is not degraded because the polarization mode dispersion (the constant component) that causes the degradation of the waveform is canceled and the modulated component that contributes to the polarized wave scramble is retained, by selecting the first polarization maintaining optical fibers 4a and the second polarization maintaining optical fiber 4b such that the polarization mode dispersions of both the first and the second polarization maintaining optical fibers 4a and 4b are equal, and the frequency characteristics of the phase difference of the first and the second polarization maintaining optical fibers 4a and 4b are different from each other.

Further, because the slopes of the frequency characteristics of the phase difference of the first and the second polarization maintaining optical fibers 4a and 4b are different from each other, the total phase difference value is increased. Therefore, it is possible to provide the polarized wave scrambler having a high scramble sensitivity.

Further, this polarized wave scrambler also does not have optical elements having polarization characteristic which are mechanically moved to control the polarization, and is manufactured using only the polarization maintaining optical fibers without using expensive parts. Therefore, a low cost polarized wave scrambler can be easily manufactured.

In the polarized wave scrambler as shown in FIG. 6, it is possible to generate either an RZ (Return to Zero) code or an NRZ (Non Return to Zero) code in the signal source 6 because the optical frequency of the light source 1 is frequency-modulated by modulating the driving current supplied from the light source driving circuit 2 with the signal having the low frequency.

Figure 9:
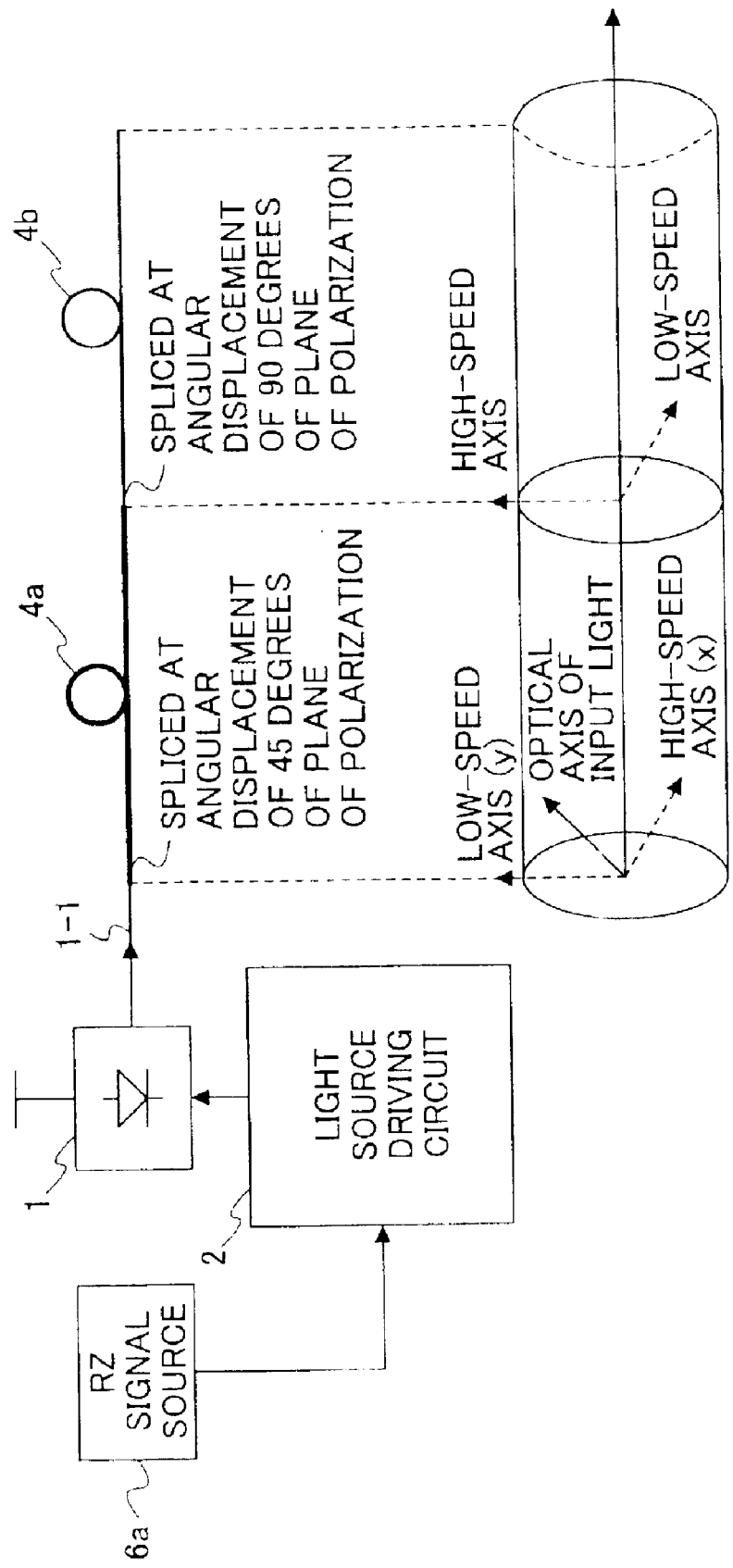
FIG. 9 shows a block diagram of an optical signal transmission apparatus using a polarized wave scrambler according to the second embodiment of the present invention.

FIG. 9 shows a block diagram of an optical signal transmission apparatus using a polarized wave scrambler according to the second embodiment of the present invention.

In FIG. 9, reference numeral 1 shows the light source which supplies the linearly polarized optical signal, for example a laser diode. It is well known that the laser diode supplies the linearly polarized light. Reference numeral 1—1 shows a pig-tail fiber that guides the light supplied from the light source 1 outside the light source 1.

Reference numeral 2 shows a light source driving circuit that supplies a driving current to the light source 1 and the light source driving circuit 2 is usually composed of a circuit of a current-switch-type.

Reference numeral 4a shows the first polarization maintaining optical fiber that is spliced to the pig-tail fiber 1—1. At the splicing point between the first polarization maintaining optical fiber 4a and the pig-tail fiber 1—1, the first polarization maintaining optical fiber 4a and the pig-tail fiber 1—1 are spliced such that the plane of polarization of the linearly polarized optical signal supplied from the light source 1 is set to an angle between the high-speed axis and the low-speed axis of the first polarization maintaining optical fiber 4a, for example 45 degrees.

Reference numeral 4b shows the second polarization maintaining optical fiber which is spliced to the first polarization maintaining optical fiber 4a. At the splicing point between the second polarization maintaining optical fiber 4b and the first polarization maintaining optical fiber 4a, the first polarization maintaining optical fiber 4a and the second polarization maintaining optical fiber 4b are spliced such that the high-speed axis of the first polarization maintaining optical fiber 4a corresponds to the low-speed axis of the second polarization maintaining optical fiber 4b, and the low-speed axis of the first polarization maintaining optical fiber 4a corresponds to the high-speed axis of the second polarization maintaining optical fiber 4b. As a result, the first polarization maintaining optical fiber 4a and the second polarization maintaining optical fiber 4b are spliced to each other at the angular displacement of 90 degrees.

The condition of splicing is shown in FIG. 9. In FIG. 9, the splicing points, the optical axis of the input signal, the high-speed axis and the low-speed axis are shown.

Reference numeral 6a shows a signal source that generates an RZ code to be transmitted through the optical fiber.

As shown in FIG. 9, features of this construction are as follows. First, the output current supplied from the light source driving circuit 2 is switched by the signal of the RZ code supplied from the RZ signal source 6a, and thereby the output light supplied from the light source 1 is frequency-modulated and intensity-modulated. Second, at the splicing point between the first polarization maintaining optical fiber 4a and the pig-tail fiber 1—1, the first polarization maintaining optical fiber 4a and the pig-tail fiber 1—1 are spliced such that the plane of polarization of the linearly polarized optical signal supplied from the light source 1 is set to an angle between the high-speed axis and the low-speed axis of the first polarization maintaining optical fiber 4a, for example 45 degrees, and the first polarization maintaining optical fiber 4a and the second polarization maintaining optical fiber 4b are spliced to each other at the angular displacement of 90 degrees.

A reason why the output light supplied from the light source 1 is frequency-modulated by switching the output current supplied from the light source driving circuit 2 according to the signal of the RZ code supplied from the RZ signal source 6a is the same reason as the output light supplied from the light source 1 is frequency-modulated by the low frequency signal. The frequency of the light source 1 varies according to the variation of the RZ code signal. The RZ code is used to modulate the light but the NRZ code is not used to modulate the light. The NRZ code cannot modulate the light while the same codes of the NRZ code are continued because the amplitude of the NRZ code does not vary.

The first polarization maintaining optical fiber 4a and the second polarization maintaining optical fiber 4b are selected in the same manner as described above.

The feature of the structure shown in FIG. 9 is that there is no need to modulate the output current supplied from the light source driving circuit 2 by the signal having the low frequency, beforehand.

As described above, the output light supplied from the light source 1 is directly modulated by the signal source. However, it is possible to modulate the output light supplied from the light source 1 by the signal source at the external modulator.

Figure 10:
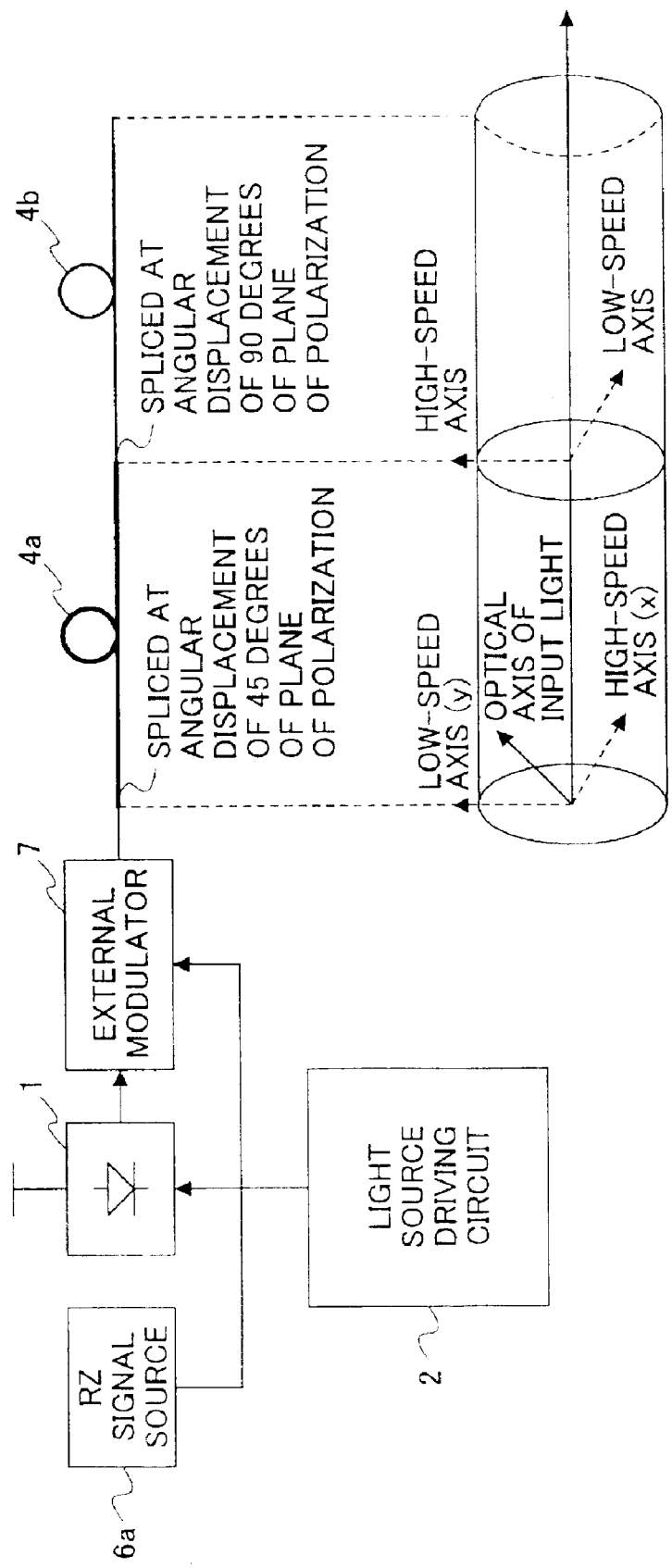
FIG. 10 shows a block diagram of an optical signal transmission apparatus using a polarized wave scrambler according to the third embodiment of the present invention.

FIG. 10 shows a block diagram of an optical signal transmission apparatus using a polarized wave scrambler according to the third embodiment of the present invention.

In FIG. 10, reference numeral 1 shows the light source which supplies the linearly polarized optical signal, for example a laser diode. It is well known that the laser diode supplies the linearly polarized light.

Reference numeral 2 shows a light source driving circuit that supplies a driving current to the light source 1 and the light source driving circuit 2 is usually composed of a circuit of a current-switch-type.

Reference numeral 7 shows an external modulator which intensity-modulates continuous light supplied from the light source 1 with the output signal supplied from the RZ signal source 6a. The external modulator 7 is manufactured on a Lithium Niobate (LiNbO$_3$) substrate, and intensity of the light is typically modulated using electro-optic effect by means of which the intensity of the light is controlled by voltage applied to one waveguide out of two waveguides provided on the Lithium Niobate (LiNbO$_3$) substrate.

Reference numeral 4a shows the first polarization maintaining optical fiber that is connected to the external modulator 7. At the connecting point between the first polarization maintaining optical fiber 4a and the external modulator 7, the first polarization maintaining optical fiber 4a and the external modulator 7 are spliced such that the plane of polarization of the linearly polarized optical signal supplied from the external modulator 7 is set to an angle between the high-speed axis and the low-speed axis of the first polarization maintaining optical fiber 4a, for example 45 degrees.

Reference numeral 4b shows the second polarization maintaining optical fiber that is spliced to the first polarization maintaining optical fiber 4a. At the splicing point between the second polarization maintaining optical fiber 4b and the first polarization maintaining optical fiber 4a, the first polarization maintaining optical fiber 4a and the second polarization maintaining optical fiber 4b are spliced such that the high-speed axis of the first polarization maintaining optical fiber 4a corresponds to the low-speed axis of the second polarization maintaining optical fiber 4b, and the low-speed axis of the first polarization maintaining optical fiber 4a corresponds to the high-speed axis of the second polarization maintaining optical fiber 4b. As a result, the first polarization maintaining optical fiber 4a and the second polarization maintaining optical fiber 4b are spliced to each other at the angular displacement of 90 degrees.

The condition of splicing is shown in FIG. 10. In FIG. 10, the splicing points, the optical axis of the input signal, the high-speed axis and the low-speed axis are shown.

Reference numeral 6a shows a signal source that generates the RZ code to be transmitted through the optical fiber.

As shown in FIG. 10, features of this construction are as follows. First, the output light supplied from the light source 1 is frequency-modulated and intensity-modulated by the RZ code supplied from the signal source 6a. Second, at the splicing point between the first polarization maintaining optical fiber 4a and the external modulator 7, the first polarization maintaining optical fiber 4a and the external modulator 7 are spliced such that the plane of polarization of the linearly polarized optical signal supplied from the external modulator 7 is set to an angle between the high-speed axis and the low-speed axis of the first polarization maintaining optical fiber 4a, for example 45 degrees, and the first polarization maintaining optical fiber 4a and the second polarization maintaining optical fiber 4b are spliced each other at the angular displacement of 90 degrees.

It is possible to polarized-wave-scramble the light using the construction shown in FIG. 10 as well as using the construction shown in FIG. 6.

The present invention is not limited to the specifically disclosed embodiments, and variations and modifications may be made without departing from the scope of the present invention.

The present application is based on Japanese priority application No. 2002-067513 filed on Mar. 12, 2002, the entire contents of which are hereby incorporated by reference.

What is claimed is:

1. A polarized wave scrambler comprising:
a first polarization maintaining optical fiber and a second polarization maintaining optical fiber, wherein a constant component of a phase difference characteristic for optical frequency between a high-speed axis and a low-speed axis of said first polarization maintaining optical fiber is equal to a constant component of a phase difference characteristic for optical frequency between a high-speed axis and a low-speed axis of said second polarization maintaining optical fiber, and a slope for optical frequency of said phase difference characteristic of said first polarization maintaining optical fiber is different from a slope for optical frequency of said phase difference characteristic of said second polarization maintaining optical fiber, wherein a plane of polarization of the linearly polarized optical signal is set to an angle between the high-speed axis and the low-speed axis of said first polarization maintaining optical fiber and said linearly polarized optical signal is supplied to said first polarization maintaining optical fiber, and wherein said first polarization maintaining optical fiber and said second polarization maintaining optical fiber are spliced such that said high-speed axis of said first polarization maintaining optical fiber corresponds to said low-speed axis of said second polarization maintaining optical fiber, and said low-speed axis of said first polarization maintaining optical fiber corresponds to said high-speed axis of said second polarization maintaining optical fiber.

2. An optical signal transmission apparatus, comprising:
a light source that supplies a linearly polarized light;
a frequency modulation part that frequency-modulates a frequency of said linearly polarized light with a signal having a lower frequency than said frequency of said linearly polarized light;
an intensity modulation part that intensity-modulates said linearly polarized light frequency-modulated by said frequency modulation part with a signal to be transmitted; and
said polarized wave scrambler having said first polarization maintaining optical fiber and said second polarization maintaining optical fiber as claimed in claim 1;
wherein a plane of polarization of said linearly polarized light intensity-modulated by said intensity modulation part is set to an angle between the high-speed axis and the low-speed axis of said first polarization maintaining optical fiber and said intensity-modulated linearly polarized light is supplied to said first polarization maintaining optical fiber.

3. An optical signal transmission apparatus, comprising:
a light source that supplies a linearly polarized light;
a frequency modulation part that frequency-modulates a frequency of said linearly polarized light with an RZ signal to be transmitted;
an intensity modulation part that intensity-modulates said frequency-modulated linearly polarized light by said frequency modulation part with said RZ signal; and
said polarized wave scrambler having said first polarization maintaining optical fiber and said second polarization maintaining optical fiber as claimed in claim 1;
wherein a plane of polarization of said intensity-modulated linearly polarized light by said intensity modulation part is set to an angle between the high-speed axis and the low-speed axis of said first polarization maintaining optical fiber and said intensity-modulated linearly polarized light is supplied to said first polarization maintaining optical fiber.

4. The polarized wave scrambler as claimed in claim 1, wherein said slope of said phase difference characteristic for optical frequency of said first polarization maintaining optical fiber and said slope of said phase difference characteristic for optical frequency of said second polarization maintaining optical fiber are changed by controlling length of said first polarization maintaining optical fiber and said second polarization maintaining optical fiber while keeping a ratio between said length of said first polarization maintaining optical fiber and said length of said second polarization maintaining optical fiber constant while said constant component of said phase difference characteristic for optical frequency between said high-speed axis and said low-speed axis of said first polarization maintaining optical fiber is kept being equal to said constant component of said phase difference characteristic for optical frequency between said high-speed axis and said low-speed axis of said second polarization maintaining optical fiber.

5. The polarized wave scrambler as claimed in claim 4, wherein a sign of said slope of said phase difference characteristic for optical frequency of said first polarization maintaining optical fiber is equal to a sign of said slope of said phase difference characteristic for optical frequency of said second polarization maintaining optical fiber.

6. The polarized waved scrambler as claimed in claim 4, wherein a sign of said slope of said phase difference characteristic for optical frequency of said first polarization maintaining optical fiber is opposite to a sign of said slope of said phase difference characteristic for optical frequency of said second polarization maintaining optical fiber.

7. The polarized wave scrambler as claimed in claim 1, wherein a sign of said slope of said phase difference characteristic for optical frequency of said first polarization maintaining optical fiber is equal to a sign of said slope of said phase difference characteristic for optical frequency of said second polarization maintaining optical fiber.

8. The polarized waved scrambler as claimed in claim 1, wherein a sign of said slope of said phase difference characteristic for optical frequency of said first polarization maintaining optical fiber is opposite to a sign of said slope of said phase difference characteristic for optical frequency of said second polarization maintaining optical fiber.

* * * * *

UNITED STATES PATENT AND TRADEMARK OFFICE
CERTIFICATE OF CORRECTION

PATENT NO. : 6,947,617 B2
APPLICATION NO. : 10/291498
DATED : September 20, 2005
INVENTOR(S) : Isao Nakajima It is certified that error appears in the above-identified patent and that said Letters Patent is hereby corrected as shown below:

First Page, Column 2 (Foreign Patent Documents), Line 1, delete "G02F/1/036" and insert -- G02f/1/035 -- therefor.
Column 15, Line 47, after "scrambler" insert -- , --.

Signed and Sealed this

First Day of August, 2006

JON W. DUDAS
*Director of the United States Patent and Trademark Office*